United States Patent Office 3,364,030
Patented Jan. 16, 1968

3,364,030
LEUCO DYE-DIACYLAZINO LIGHT-SENSITIVE DYE FORMER COMPOSITIONS
Charles Yembrick, Jr., Wilmington, Del., assignor to E. I. du Pont de Nemours and Company, Wilmington, Del., a corporation of Delaware
No Drawing. Filed Apr. 29, 1964, Ser. No. 363,593
7 Claims. (Cl. 96—90)

ABSTRACT OF THE DISCLOSURE

A composition of (1) the leuco form of a dye having removable hydrogen and (2) a diacylazino compound. A representative composition is an aminonitriarylmethane with a 1-diacylaminopyrazole. The composition can be irradiated with light of wavelengths between 2000–4200 A. whereupon the leuco dye is converted to its colored form.

---

This invention is directed to novel light-sensitive compositions and to a unique process for forming colored material from an essentially colorless one by irradiation with ultraviolet light. More particularly, the present invention involves a novel composition comprising an intimate admixture of the leuco form of a dye and a diacylazino compound. Upon irradiation with a pattern of ultraviolet light, this composition quickly undergoes a color change to form a sharp image. The diacylazino compounds which may be utilized are diacylhydrazines, and diacylamino derivatives of pyrroles, carbazoles, pyrazoles, benzimidazoles, hydrotriazines, triazoles and benzotriazoles.

Image-forming compositions and processes play an essential part in photography, thermography and related arts dealing with processes of writing, printing, and producing images with the aid of light, heat, electricity or combinations of these activating influences. Currently available methods of image production impose numerous limitations which are costly, inconvenient, time-consuming and sometimes potentially hazardous. Classical photography, for example, although efficient in employing light energy, uses expensive chemicals and papers, involves multi-step processing and drying, and requires a highly skilled operator for consistently good results.

Thermography requires less operator skill and less expensive papers than photography but produces less well-defined images which are easily destroyed. Mechanical printing, while inexpensive and rapid for repetitive copying, is decidedly more expensive and slow for sequential copying. In any event, mechanical printing yields a wet image. Presently available photochemical image-forming systems involve the use of toxic chemicals such as ammonia, cyanide derivatives, halohydrocarbons, and caustic materials. A new printing or imaging system which overcomes some of the limitations and difficulties of the existing systems would significantly advance the art and be desirable.

It is, therefore, an object of this invention to provide novel compositions sensitive to ultraviolet light and capable of forming a permanent color when irradiated. Another object is to provide a composition which forms a permanent colored image when irradiated in a graphic pattern. A further object is to provide a photosensitive paper which can be imaged by irradiation with light in a graphic pattern.

Another object is to provide a novel process for forming colored material from an essentially colorless one by irradiation with ultraviolet light.

These and other objects will become apparent from the following description and claims.

More specifically, the present invention is directed to light-sensitive compositions capable of undergoing permanent visible color change on being exposed to light of wave-length from about 2000 A. to about 4200 A. which comprises an intimate admixture of (1) a dye in the leuco form represented by $DH_n$ wherein the radical D represents a dye precursor and H is hydrogen, the removal of which forms a dye, D, differently colored than $DH_n$ and $n$ is one of the integers 1 and 2 and (2) a diacylazino compound represented by the formula

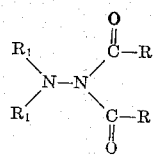

wherein R is hydrocarbyl or the R's taken together may be o-phenylene and $R_1$ is acyl or aryl or the $R_1$'s taken together with the nitrogen atom to which they are attached represent the elements required to form a 5- or 6-membered carbon-nitrogen heterocyclic ring containing 1, 2 or 3 nitrogen atoms, the said diacylazino compound being characterized by its ability to produce color when about 10 mg. is mixed with an equal weight of the defined leuco dye in 10 ml. of a 50:50 solution of ethanol and N,N-dimethylformamide and irradiated in a quartz vessel with light of wavelength from about 2000 A. to about 4200 A.

The carbon atoms of the heterocyclic ring may bear as replacements of hydrogen; Br, Cl, $NO_2$, $C_1$ to $C_4$ alkyl, phenyl, or oxo, and, when two adjacent carbons are present in the hetero ring these carbons may with carbon-hydrogen elements form a benzo or a naphtho ring which may bear as substituents Cl, Br, or $C_1$ to $C_4$ alkyl.

Preferred embodiments include a light-sensitive product comprising a supporting base carrying a light-sensitive composition as heretofore defined; paper treated with such a composition and a polymer matrix containing said composition.

A significant process for forming a colored material according to this invention is one in which the heretofore described novel light-sensitive compositions are irradiated with light having a wavelength from about 2000 A. to about 4200 A.

Another embodiment is a composition as heretofore defined in which the leuco dye is an aminotriarylmethane containing at least two p-dialkylamino-substituted phenyl groups having as a substitute ortho to the methane carbon atom an alkyl, alkoxy or halogen and the diacylazino compound is a 2-diacylaminobenzotriazole. Preferred diacylazino compounds include a 1-diacylaminopyrazole, 1-diacylamino-3,5-diphenyl-1H-1,2,4-triazole and a tetraacylhydrazine.

The leuco form of a dye which may compose the light-sensitive composition of this invention is the dye in the reduced form having one or two hydrogen atoms the removal of which together with one or two electrons produces the dye. Since the leuco form of the dye is essentially colorless, or in some instances it may be of a different color or of a less intense shade than the parent dye, it provides a means of producing an image when the leuco form is oxidized to the dye. This oxidation is accomplished in the invention by irradiation of an intimate admixture of the leuco form of the dye with a diacylazino compound with ultraviolet light in the range of wavelength from about 2000 A. to about 4200 A.

The exact mechanism of the photo-oxidation of the leuco dye in the presence of the diacylazino compound is perhaps not fully understood. The following mechanism, which we refer to as an acceptor mechanism, is proposed, but the invention gives the results stated whether or not this is the true theory involved. According to the acceptor mechanism the photo-oxidant (A–A') serves as an "acceptor" of an electron ejected by the color generator (DH) to effect an irreversible color-forming reaction giving the dye D⁺. Such a photo-oxidant generally absorbs none of the activating light. If it does absorb some of the activating radiation, the absorption is dissipated in a non-color-forming manner and does not lead to color generation. The activating radiation is, instead, absorbed by the color generator to produce a photo-excited molecule (DH*) which then undergoes an oxidation-reduction reaction with the acceptor photo-oxidant. In this process the photo-excited leuco dye molecule donates an electron to the acceptor molecule. The resultant ion radical is then converted to the dye. A possible sequence of reactions may be represented schematically as follows:

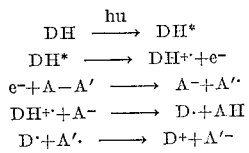

When mixed with a diacylazino compound as defined herein, a large number of dyes in the leuco form have been found to be readily converted to the parent dye by irradiation with ultraviolet light of wavelength from about 2000 A. to about 4200 A. by the above-described mechanism and are well adapted to provide new and useful image-forming compositions. Dyes in the leuco form which are operative according to the invention include:

(A) Aminotriarylmethanes such as bis(p-benzylethylaminophenyl)(o-chlorophenyl) methane,
bis(p-dimethylaminophenyl)(4-dimethylamino-1-naphthyl)methane
bis(p-dimethylaminophenyl)(1,3,3-trimethyl-2-indolinylidenemethyl)methane
bis(p-dipropylaminophenyl)(o-fluorophenyl)methane.

Because of their superior resistance to color development due to air oxidation, the preferred species of aminotriarylmethanes contain at least two p-dialkylamino-substituted phenyl groups having as a substituent ortho to the methane carbon atom an alkyl, alkoxy, or halogen. Specific examples of these preferred species include:

bis(4-dimethylamino-o-tolyl)(2-chlorophenyl)methane
bis(4-diethylamino-2-methoxyphenyl)(4-nitrophenyl)-methane
tris(4-diethylamino-2-chlorophenyl)methane
bis(4-dimethylamino-o-tolyl)(2-bromophenyl)methane
bis(4-diethylamino-o-tolyl)(4-benzylthiophenyl)-methane and
bis(4-diethylamino-o-tolyl)(2-thienyl)methane.

(B) Aminoxanthenes, such as 3-amino-6-dimethylamino-2-methyl-9-(o-chlorophenyl)-xanthene
3,6-bis(diethylamino)-9-(o-chlorophenyl)xanthene,
3,6-bis(dimethylamino)-9-(o-methoxycarbonylphenyl)xanthene.

(C) Aminothioxanthenes, such as 3,6-bis(dimethylamino)-9-(o-methoxycarbonylphenyl)-thioxanthene,
3,6-dianilino-9-(o-ethoxycarbonylphenyl)thioxanthene.

(D) Amino-9,10-dihydroacridines, such as 3,6-bis(benzamino)-9,10-dihydro-9-methylacridine,
3,6-diamino-9-hexyl-9,10-dihydroacridine.

(E) Aminophenoxazines, such as 5-benzylamino-9-diethylamino-benzo[a]phenoxazine,
3,7-bis(diethylamino)phenoxazine.

(F) Aminophenothiazines, such as 3,7-bis(dimethylamino)-4-nitrophenothiazine,
3,7-bis[N-ethyl-N-(m-sulfobenzyl)amino]phenothiazine, monosodium salt,
3,7-diaminophenothiazine.

(G) Aminodihydrophenazines, such as 3,7-bis(benzylethylamino)-5,10-dihydro-5-phenylphenazine,
3,7-bis(dimethylamino)-5-(p-chlorophenyl)5,10-dihydrophenazine,
3,7-diamino-5,10-dihydro-5-methylphenazine,
3,7-diamino-5,10-dihydro-2,5,8-trimethylphenazine.

(H) Aminodiphenylmethanes, such as 1,4-bis[bis-(p-diethylaminophenyl)methyl]piperazine,
bis(p-diethylaminophenyl)-1-benzotriazolylmethane,
bis(p-diethylaminophenyl)(2,4-dichloroanilino) methane,
bis(p-diethylaminophenyl)(octadecylamino)methane,
1,1-bis(p-dimethylaminophenyl)ethane.

(I) Aminohydrocinnamic acids (cyanoethanes), such as

α-cyano-4-dimethylaminohydrocinnamamide,
α,β-dicyano-4-dimethylaminohydrocinnamamide,
α,β-dicyano-4-(p-chloroanilino)hydrocinnamic acid, methyl ester,
p-(2,2-dicyanoethyl)-N,N-dimethylaniline,
p-(1,2,2-tricyanoethyl)-N,N-dimethylaniline.

(J) Leucoindigoid dyes, such as 7,7'-diamino-5,5'-dichloroleucothioindigo,
6,6'-dichloro-4-methylleucothioindigo,
7,7'-dimethylleucoindigo,
5,5'-disulfoleucoindigo, disodium salt,
5,5',7,7'-tetrachloroleucoindigo.

(K) 1,4-diamino-2,3-dihydroanthraquinones, such as 1,4-bis(ethylamino)-2,3-dihydroanthraquinone,
1-amino-4-methoxyanilino-2,3-dihydroanthraquinone,
1,4-diamino-2,3-dihydroanthraquinone,
1-p-(2-hydroxyethylamino)anilino-4-methylamino-2,3-dihydroanthraquinone.

(L) 1,4-bis(4,5-diaryl-2-imidazolyl)benzenes, such as 1,4-bis(4,5-diphenyl-2-imidazolyl)benzene,
1,4-bis[4,5-bis(p-methoxyphenyl)-2-imidazolyl]benzene,
1,4-bis[4,5-bis(o-chlorophenyl)-2-imidazolyl]benzene,
1,4-bis[4-(p-methoxyphenyl)-5-phenyl-2-imidazolyl]-benzene.

(M) Hydroxyphenyldiarylimidazoles, such as 2-(p-hydroxyphenyl)-4,5-diphenylimidazole,
2-(3,5-dibromo-4-hydroxyphenyl)-4,5-diphenylimidazole,
2-(3,5-dichloro-4-hydroxyphenyl)-4,5-diphenylimidazole,
2-(4-hydroxy-3,5-dimethoxyphenyl)-4,5-diphenylimidazole,
2-(3,5-dibromo-2-hydroxyphenyl)-4,5-diphenylimidazole,
4-(4-hydroxyphenyl)-2,5-diphenylimidazole,
2-(4-hydroxy-3,5-dimethoxyphenyl)-4,5-bis(p-methoxyphenyl)imidazole.

Of the above leuco forms of dyes, (A) through (H) form the dye by losing one hydrogen atom, while the leuco forms (I) through (M) lose two hydrogen atoms to produce the dye.

With the leuco form of dyes which have amino or substituted amino groups within the dye structure, a mineral acid, organic acid, or an acid from an acid-supplying compound is preferably employed to achieve highest optical density. The amount of acid may vary from 0.33 mole to 1.5 miles per mole of amino nitrogen in the dye. The preferred quantity of acid is about one mole per mole of amino nitrogen. Acid in large excess of that required to form a salt with the amino nitrogen should be avoided because it may render the composition less light-sensitive.

Representative acids which form the required amine salts are hydrochloric, hydrobromic, sulfuric, nitric, phosphoric, acetic, oxalic, and p-toluenesulfonic. Other acids such as acids in the "Lewis" sense or acid sources which may be employed in the presence of water or moisture include zinc chloride, zinc bromide, ferric chloride, $\alpha,\alpha,\alpha$-trichlorotoluene.

Representatives of acylazino compounds which may be used with the foregoing leuco dyes in photosensitive compositions in accordance with the invention include:

(A) 1,1-diacylhydrazines, such as 1,1-diacetyl-2,2-diphenylhydrazine,
tetraacetylhydrazine,
1,1-dibutyryl-2,2-di-o-tolylhydrazine,
tetrapropionylhydrazine,
tetrabenzoylhydrazine.

(B) Diacylaminopyrroles, such as 1-(diacetylamino)-2,5-dimethylpyrrole,
1-(dibutyrylamino)-3-ethyl-2,4-dimethylpyrrole,
1-(dibenzoylamino)-3,4-diethyl-2-methylpyrrole,
1-(dibenzoylamino)-2,5-diphenylpyrrole.

(C) Diacylaminocarbazoles, such as 5-(diacetylamino)carbazole,
5-(dibenzoylamino)-3,7-dimethylcarbazole.

(D) Diacylaminopyrazoles, such as 1-(diacetylamino)pyrazole,
1-(diacetylamino)-4-chloropyrazole,
1-(diacetylamino)-4-methylpyrazole,
1-(diacetylamino)isoindazole,
2-(diacetylamino)indazole,
1-(dipropionylamino)-4-nitropyrazole,
1-(dibenzoylamine)-3,4,5-tribromopyrazole.

(E) Diacylaminobenzimidazoles, such as 1-(diacetylamino)benzimidazole,
1-(dibenzoylamino)-2-methylbenzimidazole.

(F) Diacylaminohydrotriazines, such as 4-(diacetylamino)-4,5-dihydro-3-oxo-6-phenyl-as-triazine,
4-(dipropionylamino)-2,3,4,5-tetrahydro-2,6-diphenyl-as-triazine,
3-(dibenzoylamino)-3,4-dihydro-4-oxo-1,2,3-benzotriazine.

(G) Diacylaminotriazoles, such as 1-(diacetylamino)-4,5-diphenyl-1H-1,2,3-triazole,
1-(dipropionylamino)-4,5-dimethyl-1H-1,2,3-triazole,
1-(dibenzoylamino)-4,5-diphenyl-1H-1,2,3-triazole,
4-(diacetylamino)-4H-1,2,4-triazole,
1-(dibutyrylamino)-3,5-dimethyl-1H-1,2,4-triazole,
1-(dibenzoylamino)-3,5-diphenyl-1H-1,2,4-triazole,
4-(dibenzoylamino)-3,5-diphenyl-4H-1,2,4-triazole,
N-(3,5-dimethyl-4H-1,2,4-triazol-4-yl)phthalimide.

(H) Diacylaminobenzotriazoles, such as 1-(diacetylamino)-1H-benzotriazole,
1-(dibutyrylamino)-1H-benzotriazole,
1-(dibenzoylamino)-5-chloro-1H-benzotriazole,
2-(diacetylamino)-2H-benzotriazole,
2-(diacetylamino)-6-chloro-5-methyl-2H-benzotriazole,
2-(dipropionylamino)-5-methyl-2H-benzotriazole,
2-(diacetylamino)-2H-naphtho[2,3-d]triazole,
2-(dibenzoylamino)-2H-naphtho[1,2-d]triazole.

The preparation of the above diacylazino compounds is accomplished as described in the chemical literature. The general procedure is to acylate by well-known methods the corresponding amino derivative of the parent compound.

Operable compositions of the heretofore described leuco dyes and a diacylazino compound as above illustrated are observed and identified in the following way. About 10 mgs. of both the leuco dye and the diacylazine compound are added to about 10 mls. of a solution of equal parts by volume of ethanol and N,N-dimethylformamide contained in a quartz vessel. The solution is stirred to insure that at least a portion of each of the added solid materials dissolves. The resultant solution is then irradiated with light having a wavelength from about 2000 A. to about 4200 A. The formation of an intense color in the solution indicates a light-sensitive composition.

Other solvents and combinations of solvents may be used with particular compositions. However, the above combination of solvents has been found to be the most generally applicable to the entire range of compounds which are useful in the present invention.

Solvents which are inert toward the leuco form of the dye and the diacylazino compound are usually employed to dissolve these components, and thereby mix them together, and to provide a fluid medium for a convenient and ready application of the light-sensitive composition to substrates. It is preferable to have at least 0.5% by weight of the solvent retained by such a substrate as paper to ensure optimum image formation upon radiation with ultraviolet light. It is not necessary that the substrate be wet with solvent, humidified, or specially handled. In general, a preferred solvent has a boiling point of at least 60° C. at atmospheric pressure. Solvents with high boiling points that are not readily removed by evaporation may be used when their quantity is restricted as it can be in mixtures with other solvents having relatively high vapor pressures. Representative solvents which may be employed are formamide, N,N-dimethylformamide, N,N-dimethylacetamide, hexanamide, stearamide, acetone, methanol ethanol, 1-propanol, 2-propanol, butanol, ethylene glycol, polyethylene glycols, ethyl acetate, ethyl benzoate, benzene, o-dichlorobenzene, toluene, dimethylsulfoxide, pyridine, tetrahydrofuran, dioxane, and mixtures of these solvents in various proportions as may be required to attain solution of the leuco dye and the bibenzotriazole selected for use in the photosensitive composition.

In addition to a residual amount of a solvent a polymeric binder or matrix may be present in the light-sensitive composition spread over or contained in a substrate. A binder which may optionally be added to the composition is an inert material that serves to adhere the photosensitive mixture to the substrate. The binder may also serve to thicken the solution of the composition should this be desirable for specific applications. The light-sensitive composition may also be mixed with a polymeric material which can serve as a matrix for the photosensitive composition and the mixture may be cast, extruded or otherwise formed into unsupported films. These films may then be used for image formation as are the substrates bearing the light-sensitive mixture of leuco dye and diacylazino compound.

Examples of binders and matrices that will be found applicable are ethyl cellulose, polyvinyl alcohol, polyvinyl chloride, polystyrene, polyviny acetate, poly-(methyl methacrylate), cellulose acetate, cellulose nitrate, chlorinated rubber, copolymers of vinyl monomers, gelatin. A binder or matrix will be used in an amount varying from about 0.5 part to about 200 parts by weight per part of combined weight of leuco dye and diacylazino compound. Amounts within the range of about 0.5 part to 10 parts will be used when the polymer functions as an adhesive or thickener, while higher amounts will be used when the polymer forms an unsupported film containing the photosensitive composition. With certain polymer matrices, the addition of a plasticizer may be desirable to give flexibility to the film or coating containing the photosensitive composition.

The substrates are materials to which these light-sensitive, image-forming compositions may be applied as a coating or impregnant. They are materials commonly used in the graphic arts and in decorative and protective applications. These materials include paper varying in type from tissue paper to heavy cardboard; films of plastics and polymeric materials such as regenerated cellulose, cellulose acetate, cellulose nitrate, polyesters of glycol and terephthalic acid, polyethylene, polyvinyl acetate, poly(methyl methacrylate) and the like; textile fabrics; glass; wood and metals.

The compositions of this invention may be prepared by making a solution of the leuco dye ranging in concentration from about 0.5% by weight to the limit of its solubility in the selected solvent or solvent mixture and to add to this solution a diacylazino compound in an amount about equivalent on a molar basis to the leuco dye. Optionally, a binder as described above may be added to the solution. The selection of the leuco dye will depend upon the color and quality of the image desired. Two or more leuco dyes may be used in combination to obtain a particular color or shade of color or to provide a neutral gray or black coloration in the image.

In applying a solution of the photosensitive composition to paper, films, fabrics, or to the surfaces of rigid substrates such as glass, wood, plastics, or metals, the solution may be sprayed, brushed applied by a roller or an immersion coater, flowed over the surface, picked up by immersion, or spread by other means. Complete coverage of the substrate may be attained or a pattern of the light-sensitive composition may be printed on the substrate. In impregnating paper, for instance, such concentrations of solution and pick-up by the paper are made so as to provide from about 0.01 mg./in.$^2$ to about 5.0 mg./in.$^2$ of leuco dye and the equivalent amount of diacylazino electron acceptor. Images of greater and lesser intensity of color are provided by the application of greater and lesser amounts of leuco dye to the substrate.

The substrates bearing the solution of the leuco dye and diacylazino compound, and optionally a binder, may be dried simply at room temperature. They also may be dried under vacuum at room temperature or at elevated temperatures. The upper temperature limit is critical in combination with exposure time. A short exposure to heat of 90° C. may not be detectably harmful, while several hours' exposure to this heat may reduce the light sensitivity of the composition.

The leuco dye and the diacylazino compound utilized according to this invention may be mixed in mole ratios within the range from about 10:1 (leuco dye:diacylazino compound) to about 1:10. The preferred range depends upon the light absorption characteristics of those substances. Thus, should the diacylazino compound and the leuco dye absorb light of essentially the same wavelengths, the diacylazino compound would screen the leuco dye so that a high ratio of the components (i.e. a relatively higher quantity of leuco dye) is needed to give adequate color intensity. Preferred combinations of leuco dyes and diacylazino compounds are those with which little or no overlap of light absorption occurs. For these compositions, the preferred range is 2:1 to 1:2 with the preferred ratio being about 1:1.

Any convenient source of ultraviolet light of wavelength that is absorbed in part by the leuco dye of the photosensitive composition of the invention may be used to activate the composition and induce the formation of an image. Among the light sources which have been employed are a sun lamp, an electronic flash gun, a germicidal lamp, ultraviolet lamps providing specifically light of short wavelength (2537 A.) and lamps providing light of long wavelength (3663 A.). The light exposure time will vary from a fraction of a second to several minutes depending upon the intensity of the light, its distance from the light-sensitive composition, the nature and amount of the light-sensitive composition, and the intensity of color in the image desired. In general, light sources that emit radiation in the region between about 2000 A. and about 4200 A. are useful in producing color in solutions of the leuco dye-diacylazino compound compositions and images with these compositions on numerous substrates.

Images may be formed by a beam of light or by exposure to light of a selected area behind a negative, a stencil, or relatively opaque pattern. The negative may be one formed by a silver halide photographic process. The negative may also be one in which the opacity results from aggregations of areas of different refractive index. Image formations may also be effected in conventional diazo printing apparatus.

The novel, light-sensitive compositions herein described and claimed have significant utility in a variety of applications. Among these are:

(1) *Printing applications.*—Very soft paper, as for example tissue paper, can be easily imaged when it has been treated with the subject photosensitive composition, by projecting an image onto the treated surface.

(2) *Radiation dosimeters.*—Paper or plastic film may be impregnated or coated with the subject photosensitive compositions and these may be used to determine the quantity of solar radiation that falls on a particular surface.

(3) *Layout for metal working.*—The photosensitive composition may be applied to a metal surface when suitably formulated as a paint or lacquer. The metal surface may then be marked by irradiation through a suitable template to produce an image. The image may correspond to holes which are to be drilled or other operations of metal working and manufacture. This technique is particularly valuable when the metal to be marked has an irregular shape.

(4) *Blueprints.*—When applied to paper or plastic films, the light-sensitive compositions of this invention can find application in diazo printout equipment.

Representative examples further illustrating the present invention follow.

EXAMPLE 1

In one part of N,N-dimethylformamide are dissolved 0.005 part of 2-(diacetylamino)benzotriazole and 0.005 part of tris(4-diethylamino-o-tolyl)methane zinc chloride-hydrochloride salt. A portion of the solution is used to saturate a piece of filter paper, and the paper is dried in air at room temperature in the dark. A section of the paper is exposed to light from a 275 watt sun lamp at a distance of 4 inches for 10 seconds. The exposed area of the paper develops an intense blue color while the unirradiated part remains colorless. Paper similarly impregnated with the leuco dye alone, i.e. not mixed with the 2-(diacetylamino)-benzotriazole, remains essentially colorless under these exposure conditions.

The same intense blue color develops in other portions of the paper bearing the leuco dye and 2-(diacetylamino)-benzotriazole upon exposure for about 2 milliseconds to the light from a xenon flash tube having a light output of 5000 candle power seconds. Also a blue color is obtained when the treated paper is exposed for 20 seconds to the light of ultraviolet lamps fitted with filters to allow transmission of light essentially at wavelengths of 2537 A. and 3660 A. respectively.

A portion of the solution containing the leuco dye and 2-(diacetylamino)benzotriazole is placed under the sun lamp for about one minute and a dark blue color develops as a result of oxidation of the leuco dye to the dye itself.

In the same way on the paper and in solution, tris-(4-diethylamino-o-tolyl)methane, tris(p-diethyl-aminophenyl)methane, and p-(1,2,2-tricyanoethyl)-N,N-dimethylaniline, in combination with 2-(diacetylamino)-benzotriazole are oxidized to their respective dyes.

Similarly, other mixtures of leuco dyes and a diacylazino compound are applied to paper and color obtained upon exposure to ultraviolet light. In the absence of the diacylazino compound, the paper remains essentially colorless. Irradiation through a stencil produces a well-defined image. The particular leuco dyes and diacylazino compounds employed in the mixtures and the color produced upon irradiation with ultraviolet light are listed in Table I which follows:

hydrocinnamic acid, a leucoindigoid dye, a 1,4-diamino-2,3-dihydroanthraquinone, a 1,4-bis(4,5-diaryl-2-imidazolyl)benzene, and a hydroxyphenyldiarylimidazole.

TABLE I

| Example Number | Leuco Dye | Diacylazino Compound | Photooxidation Product | Color |
|---|---|---|---|---|
| 2 | Tris(4-diethylamino-o-tolyl)methane | 1,1-diacetyl-2,2-diphenylhydrazine | Corresponding methane dye | Blue. |
| 3 | Tris(4-diethylamino-o-tolyl)-methane·3HCl | Tetrabenzoylhydrazine | ----do---- | Do. |
| 4 | Tris(4-diethylamino-o-tolyl)methane, ZnCl·HCl | 1-diacetylamino-4-chloropyrazole | ----do---- | Do. |
| 5 | p-(1,2,2-tricyanoethyl)-N,N-dimethylaniline | As Example 4 | p-(1,2,2-tricyanovinyl)-N,N-dimethylaniline | Red-Orange. |
| 6 | Tris(p-diethylaminophenyl)methane | ----do---- | Corresponding methane dye. | Purple. |
| 7 | As Example 3 | 1-dibenzoylamino-4,5-diphenyl-1H-1,2,3-triazole | As Example 3 | Blue. |
| 8 | As Example 4 | 1-diacetylamino-3,5-diphenyl-1H-1,2,4-triazole | As Example 4 | Do. |
| 9 | As Example 2 | As Example 8 | As Example 2 | Do. |
| 10 | As Example 6 | ----do---- | As Example 6 | Purple. |
| 11 | As Example 5 | ----do---- | As Example 5 | Red-Orange. |
| 12 | As Example 4 | 1-diacetylaminobenzotriazole | As Example 4 | Blue. |
| 13 | As Example 6 | As Example 12 | As Example 6 | Purple. |

The preceding representative examples may be varied within the scope of the present total specification disclosure, as understood and practiced by one skilled in the art, to achieve essentially the same results.

As many apparently widely different embodiments of this invention may be made without departing from the spirit and scope thereof, it is to be understood that this invention is not limited to the specific embodiments thereof.

The embodiments of the invention in which an exclusive property or privilege is claimed are defined as follows:

1. A light-sensitive composition capable of undergoing permanent visible color change on being exposed to light of wavelength from about 2000 A. to about 4200 A., said composition comprising an intimate admixture of (1) the leuco form of a dye having one or two removable hydrogen atoms, the removal of which forms a differently colored compound, and (2) a diacylazino compound represented by the formula

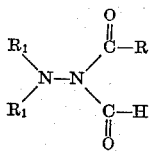

wherein R is hydrocarbyl; the R's taken together may be o-phenylene and $R_1$ is selected from the group consisting of acyl and aryl; the $R_1$'s taken together with the nitrogen atom to which they are attached represent the elements required to form a 5- or 6-membered carbon-nitrogen heterocyclic ring containing from 1 to 3 nitrogen atoms, said diacylazino compound being characterized by its ability to produce color when about 10 mg. of said compound is mixed with an equal weight of said leuco dye in 10 ml. of a 50:50 solution of ethanol and N,N-dimethylformamide and irradiated in a quartz vessel with light of wavelength from about 2000 A. to about 4200 A.

2. The compound of claim 1 wherein the leuco form of the dye of component (1) is selected from the class consisting of an aminotriarylmethane, an aminoxanthene, an aminothioxanthene, an amino-9,10-dihydroacridine, an aminophenoxazine, an aminophenothiazine, an aminodihydrophenazine, an aminodiphenylmethane, an amino- 3. The composition of claim 1 wherein the leuco form of the dye of component (1) is selected from the class consisting of
  (A) an aminotriarylmethane containing at least two p-dialkylamino-substituted phenyl groups having as a substituent ortho to the methane carbon an alkyl, alkoxy or halogen group;
  (B) salts thereof formed with mineral acids;
  (C) salts thereof formed with organic acids, and
  (D) salts thereof formed with an acid-supplying compound;

and wherein the diacylazino compound of component (2) is selected from the group consisting of
  (A) a 2-diacylaminobenzotriazole,
  (B) a 1-diacylaminopyrazole,
  (C) a 1-diacylamino-3,5-diphenyl-1H - 1,2,4 - triazole, and
  (D) a tetraacylhydrazine.

4. A light-sensitive product consisting essentially of a supporting base carrying a light-sensitive composition according to claim 1.

5. Paper treated with a light-sensitive composition according to claim 1.

6. A polymer matrix containing a light-sensitive composition according to claim 1.

7. A process for forming a colored material wherein a light-sensitive composition according to claim 1 is irradiated with light having a wavelength of from about 2000 A. to about 4200 A.

References Cited
UNITED STATES PATENTS 3,284,205   11/1966   Sprague et al. _____ 96—90

OTHER REFERENCES

Carroll, B. H., "The Photochemical Oxidation of Leuco-Bases." J. Phys. Chem., vol. 30, No. 1, pp. 130–133 (1926).
Trave et al., C. A. 55, 9382 (1961).
Vorlander et al., Ber. 68, 2269 (1935).
Stolle, J. Prakt., Chem. 78, 544 (1908).
Freundler, Bull. Soc. Chem. 31, 620 (1904).

NORMAN G. TORCHIN, *Primary Examiner.*
C. E. DAVIS, *Assistant Examiner.*